(12) United States Patent
Yousef et al.

(10) Patent No.: US 8,151,427 B1
(45) Date of Patent: Apr. 10, 2012

(54) METHOD OF ACCURATELY FIXTURING STAMPED WORK PARTS AFTER TRIM AND BEND PROCESS

(75) Inventors: Tarik Yousef, Raymond, OH (US); Richard N. Carlisle, Dublin, OH (US); Corey Clemans, Plain City, OH (US); Jonathan M. Varner, Marion, OH (US); Julio Malpica, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 482 days.

(21) Appl. No.: 12/414,929

(22) Filed: Mar. 31, 2009

(51) Int. Cl.
*B23Q 17/00* (2006.01)

(52) U.S. Cl. ............... 29/407.01; 29/407.05; 29/407.09; 73/783

(58) Field of Classification Search ............... 29/407.01, 29/407.05, 407.06, 407.09; 72/31.01, 31.1, 72/702; 73/783
See application file for complete search history.

(56) References Cited

U.S. PATENT DOCUMENTS

| | | | | |
|---|---|---|---|---|
| 3,352,136 A | * | 11/1967 | Clarke | 72/16.2 |
| 4,802,357 A | * | 2/1989 | Jones | 72/17.3 |
| 4,979,385 A | * | 12/1990 | LaFrasse et al. | 72/17.3 |
| 4,989,439 A | * | 2/1991 | Ewert et al. | 72/372 |
| 5,380,978 A | | 1/1995 | Pryor | |
| 5,913,929 A | * | 6/1999 | Gustafsson et al. | 72/31.1 |
| 6,738,507 B2 | | 5/2004 | Liasi et al. | |
| 6,947,809 B2 | | 9/2005 | Ren et al. | |
| 7,117,065 B1 | | 10/2006 | Xia et al. | |
| 7,194,388 B2 | | 3/2007 | Chu et al. | |
| 7,395,128 B2 | | 7/2008 | Zhu et al. | |
| 7,415,400 B2 | * | 8/2008 | Zhu et al. | 703/7 |
| 7,584,637 B2 | * | 9/2009 | Ghiran et al. | 72/31.05 |
| 2003/0182005 A1 | * | 9/2003 | Chu et al. | 700/97 |
| 2004/0073323 A1 | * | 4/2004 | Zhu et al. | 700/31 |
| 2004/0176863 A1 | * | 9/2004 | Ren et al. | 700/98 |
| 2006/0201229 A1 | * | 9/2006 | Zhu et al. | 72/413 |
| 2007/0193012 A1 | | 8/2007 | Bergman et al. | |
| 2008/0072652 A1 | * | 3/2008 | Mondani | 72/389.3 |
| 2009/0178453 A1 | * | 7/2009 | Ghiran et al. | 72/31.05 |
| 2010/0096765 A1 | * | 4/2010 | Kuwayama et al. | 264/40.1 |

FOREIGN PATENT DOCUMENTS

JP 2007229724 A * 9/2007

* cited by examiner

*Primary Examiner* — Essama Omgba
(74) *Attorney, Agent, or Firm* — Rankin Hill & Clark LLP

(57) ABSTRACT

A method and device is provided for measuring springback of a vehicle panel within a deformation press. This avoids the need for removing the panel from the press and fabricating a dedicated measuring fixture. A trim die in the deformation press is retrofit to perform an additional function, namely securing a deformed panel in a position such that a measurement of the panel can be made. The trim die is retrofit by modifying existing apertures and adding additional aperture (s) in required positions. In the process, after bending the panel into the press and, using the trim die, undesired material is trimmed from the deformed panel. The panel is raised and at least three fixture posts are placed in apertures in the trim die. The panel rests on the posts with one post securing the panel in either one, two or three directions. The panel is then scanned or otherwise measured to determine springback in the panel.

17 Claims, 4 Drawing Sheets

METHOD OF ACCURATELY FIXTURING STAMPED WORK PARTS AFTER TRIM AND BEND PROCESS

BACKGROUND OF THE INVENTION

Manufacture of vehicle panels such as fenders etc. requires one or more sheet metal forming operations such as bending, drawing, trimming etc., referred to, in general herein, as stamping operations. Such operations include the use of dies wherein a first die comes in close proximity with a second die to deform sheet metal, located in between, into a desired shape. However, because sheet metal parts are thin and are subjected to relatively small strains, they are subject to the phenomenon of springback (i.e. the sheet metal deflects slightly back toward its original shape). The degree of springback in a particular panel must be determined so the dies and forming operations can be designed such that the desired final shape is met, with the effects of springback taken into account.

Springback in a part can be approximated by computer simulation of a metal forming operation, but eventually the simulation should be confirmed by deforming an actual part. Whether the confirmation test is performed in a lab or on the factory floor, typical practice includes deforming the panel within a stamping press, and then moving the deformed panel out of the press and to a dedicated fixture, where the panel is secured, and where the springback of the panel is then measured using a CMM (Coordinate Measuring Machine) or laser scanning measuring process.

When measuring springback, it is important to secure one portion of the panel in a known position so the measured deformation in another position is representative of actual springback.

Fabricating several dedicated measuring fixtures for securing and measuring a deformed part is expensive, especially when a large number of significantly different shaped panels are formed. What is desired is a way to avoid having to manufacture a dedicated fixture and move a deformed panel to the dedicated fixture in order to measure springback.

BRIEF SUMMARY OF THE INVENTION

A method and device is provided for measuring springback of a vehicle panel within or outside of a deformation press. A trim die, used in the deformation press, is retrofit to perform an additional function, namely for acting as a fixture to secure a deformed panel in a position such that a measurement of springback of the panel can be made. The trim die is retrofit by modifying existing apertures and adding additional aperture(s) in required positions. In the process, after drawing the panel in the press, using the trim die, undesired material is trimmed from the deformed panel. The trim die is then either removed from the press for fixturing of the panel or fixturing is performed with the trim die remaining in the stamping press. The panel is raised and at least three fixture posts are placed in the new/modified apertures in the trim die. The panel rests on the posts with one post securing the panel in either one, two or three directions. The panel is then scanned or otherwise measured to determine springback in the panel.

These and other features, aspects and advantages of the present invention will be fully described by the following description, appended claims, and accompanying drawings.

DETAILED DESCRIPTION OF THE INVENTION

Figure 1:
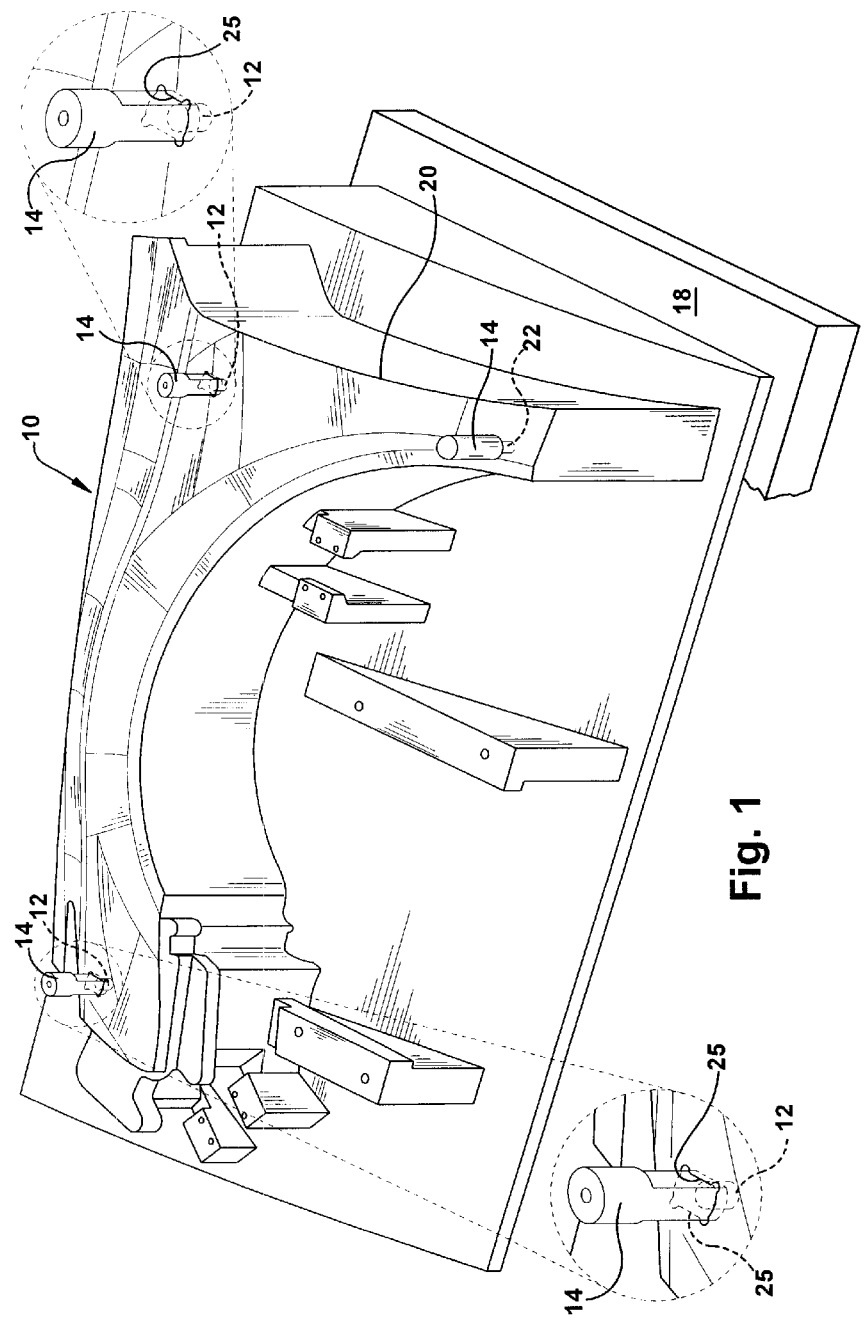
FIG. 1 is a perspective view of a multi-purpose trim die according to the invention.
Figure 2:
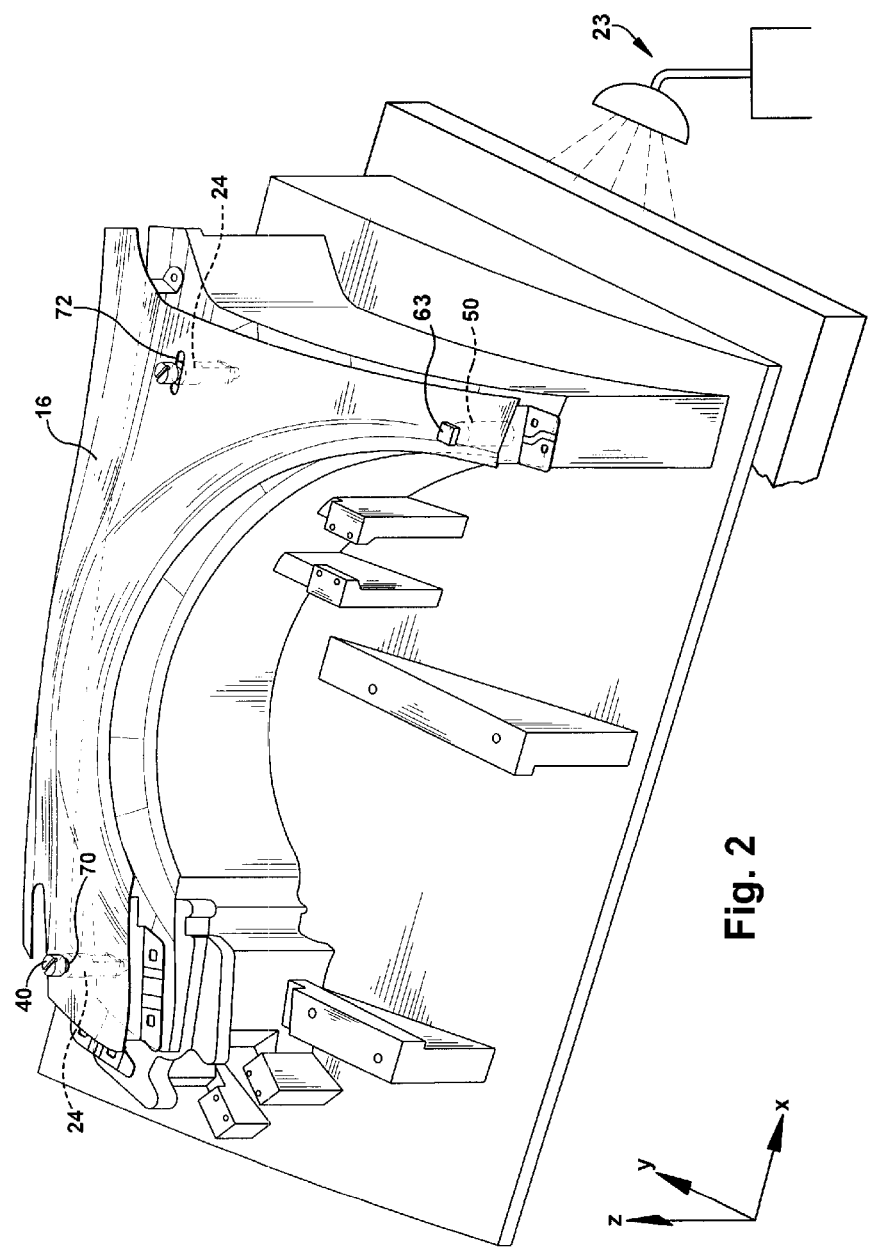
FIG. 2 is a perspective view of a vehicle panel supported on the multi-purpose trim die.

Referring to the drawings, specifically FIGS. 1 and 2, a multi-purpose trim die 10 according to the present invention is illustrated. The trim die 10 includes at least three apertures 12, 22 that receive fixture posts 14 that support a vehicle panel 16 or other stamped work part. The trim die 10 and fixture posts 14 facilitate measurement of springback in the vehicle panel 16 as described in more detail below.

Referring to FIG. 1, a trim die 10 for a vehicle panel 16 is shown. The trim die 10 is located in a dedicated stamping press 18, a portion of which is illustrated, or in one position within a multi-stage stamping press. A blank of sheet metal that was first deformed within another press or another position within the multi-stage press is moved to a position on the trim die 10 to have extraneous material trimmed therefrom. Thus, trimming is performed before springback within the vehicle panel 16 is measured.

The trim die 10 has a shape determined by the shape of the vehicle panel 16 being trimmed. Outer edges 20 of the trim die 10 form one cutting surface that trims extraneous material. The other cutting surface is on a mating die (not illustrated) supported on a ram portion of the press 18. The trim die 10 includes several apertures 12 used to support tools, often referred to as buttons (not illustrated). The button acts in conjunction with a punch tool on the press ram portion to form an aperture within a panel. Two apertures 12 within the trim die 10 serve a dual purpose, both for supporting buttons in prior/later operations and for supporting a fixture post 14 in the measuring operation. As illustrated, the apertures 12 are modified by machining to have a unique shape. Flats 25 are defined within the aperture 12 that match the specific shape of a fixture post 14 that is supported in the aperture 12. A cylindrical portion below the machined portion supports a cylindrical portion of the fixture post 14, or a button in other operations. A third aperture 22 is provided in the trim die 10, dedicated only to holding a fixture post 14 for measurement of springback. FIG. 2 shows a laser scanning device 23 used in the measurement of springback.

Figure 4A:
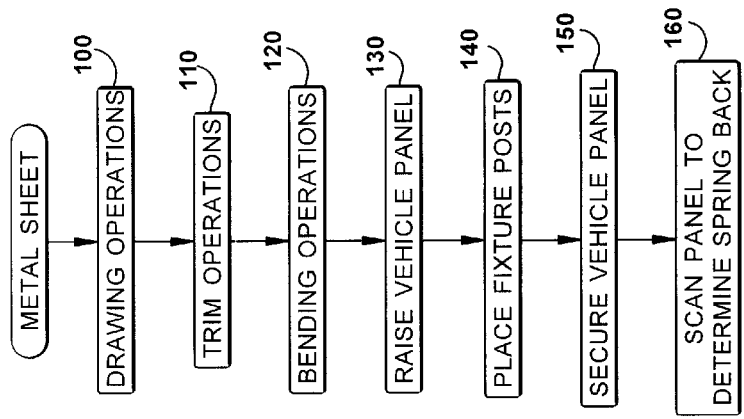
FIG. 4A is side elevational view of a first fixture post.
Figure 4B:
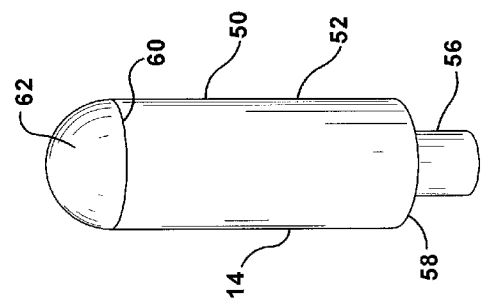
FIG. 4B is a cross sectional view of the first fixture post.
Figure 5:
FIG. 5 is a side elevational view of a second fixture post.

FIGS. 4A and 4B show a first type 24 of fixture post 14 that is supported in the trim die apertures 12. The first post 24 includes a generally cylindrical main body 26. Projecting from a proximal end 28 of the main body 26 is a cylindrical projection 30 having a smaller diameter than the adjacent portion of the main body 26. This projection 30 fits into the cylindrical portion of the aperture 12 on the multi-purpose trim die 10. The main body 26 of the first type of fixture post 24 includes two flat surfaces 35. These surfaces 35 act as an alignment and locking mechanism. As described below the distal end 34 of the first fixture posts 24 are specifically shaped to match the vehicle panel 16. A first fixture post 24 must, therefore, be aligned properly when inserted into the trim die 10. The apertures 12 in the trim die include matching flats 25 previously described therein, thus allowing only one type of first fixture post 24 to be inserted into each aperture on the upper portion of the trim die 10. Herein, the flats 35 on the first fixture posts 24 are offset by 180 degrees and have different widths, as clearly shown in FIG. 4B to allow insertion in only one orientation. When the first fixture post 24 is installed in the trim die 10, the flat surfaces 35 of the main body 26 lock into matching flats 25 around the apertures 12 of the trim die 10. Thus, the first fixture post 24 can not rotate and only the correct post can be placed in each hole. The width of the flats 35 can be varied between different first fixture posts 24 so the posts 24 are distinguishable from one another.

The distal end 34 of the first fixture post 24 is shaped in a manner that matches a corresponding position on the underside of the vehicle panel 16. Thus, when the vehicle panel 16 is supported on the first fixture post 24, almost the entire contact surface 36 at the distal end 34 of the first fixture post 24 contacts the underside of the vehicle panel 16. The distal end 34 of the first fixture post 24 also includes an axial threaded aperture 38 therein. The aperture 38 is countersunk. A screw 40 with a head 42 having an interior tapered surface 44 is threadingly engagable within the threaded aperture 38 of the first fixture post 24.

The second type of fixture post 50 also includes a generally cylindrical main body 52. Projecting from a proximal end 54 of the second post is also a cylindrical projection 56 having a smaller diameter than the adjacent portion of the main body 52. This projection 56 fits into an aperture 22 on the multi-purpose trim die 10. When the second fixture post 50 is installed in the trim die 10, the transition 58 between the projection 56 and the remainder of the main body 52 seats on the exterior surface of the trim die 10.

The distal end 60 of the second fixture post 50 has a semi-spherical cap 62 thereon. Thus, when the vehicle panel 16 is supported on the second fixture post 50, there is simple point contact between the distal end 60 of the second fixture post 50 and the underside of the vehicle panel 16. The spherical cap 62 can be manufactured of a magnetic material, thus contact with the underside of a steel vehicle panel 16 is maintained. Alternatively, the spherical cap 62 is steel and a separate magnet 63 is used on the opposite side of an aluminum vehicle panel from the spherical cap 62 to hold the panel 16 in place as shown in FIG. 2.

Figure 3:
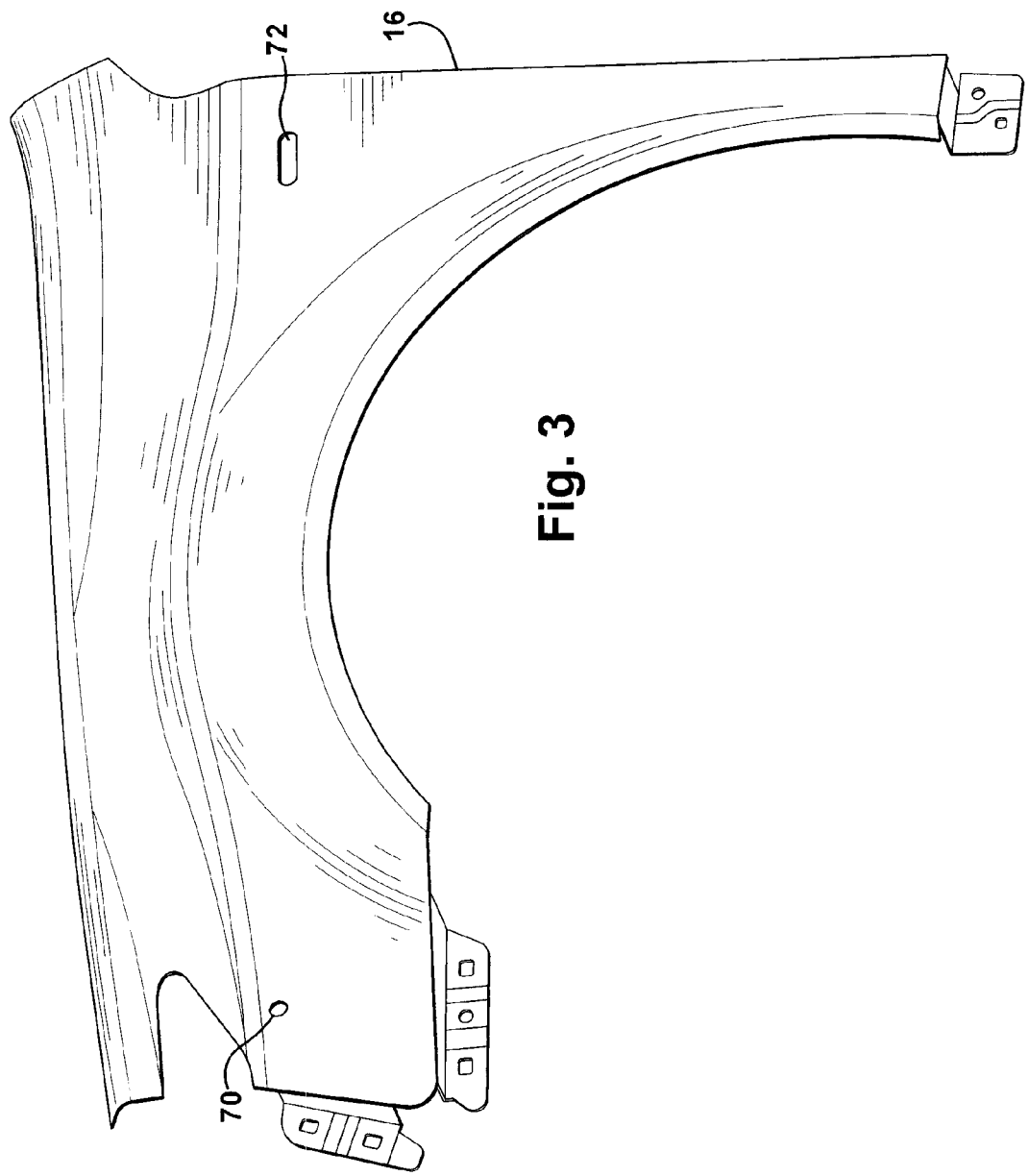
FIG. 3 is a perspective view of a vehicle panel alone.

The vehicle panel 16 illustrated in FIGS. 2 and 3 is a fender, although any vehicle panel may be used. For springback testing purposes, the vehicle panel 16 is provided with at least two apertures 70 and 72 therein. In the left side of the vehicle panel, a generally circular aperture 70 is placed. When this generally circular aperture 70 is placed over the distal end of a first post 24 supported in the trim die 10, the screw 40 can be secured within the threaded aperture 38 in the post 24. The tapered inner surface 44 of the screw 40 contacts the circular aperture 70 around its entire perimeter and, thus, restrains movement of the vehicle panel 16 within the X, Y, and Z directions.

In the right side of the vehicle panel 16, a generally rectangular aperture 72 with rounded ends is placed. When this aperture 72 is placed over the distal end of a first type post 24 supported in the trim die 10, a screw 40 can be secured within the threaded aperture 38 in the first type post 24. The tapered inner surface 44 of the screw 40 contacts only a portion of the rectangular aperture 72 and, thus, restrains movement of the vehicle panel within the Y and Z directions (or X and Z directions depending on the orientation of the rectangle). If screws 40 are not secured in either position near the first and second apertures 70 and 72 formed in the vehicle panel, then only movement of the panel in a Z direction is constrained, by the magnet used as a part of or in conjunction with the second type post 50, holding the metallic panel.

Figure 6:
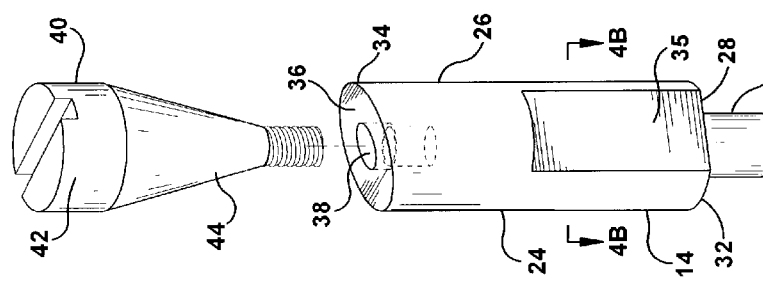
FIG. 6 is flowchart illustrating the method of the present invention.

A method of operation is illustrated within a flowchart in FIG. 6. Beginning with a metal blank, drawing operations are performed in a first step 100. Trim operation(s) are next performed in step 110. The formed vehicle panel 16 is placed over the trim die and the press activated in order to bring two dies together. When the dies are brought together excess material on the vehicle panel is trimmed off the vehicle panel 16. In step 115, any required bending operations are performed. The vehicle panel 16 is then returned to the trim die 10.

In step 120, the vehicle panel 16 is lifted slightly in order to put at least three fixture posts 14 into position 130 between the vehicle panel 16 and the trim die 10. Depending on the direction of restraint desired, in step 140 zero, one or two screws 40 are secured into fixture posts 24 of the first type supported on the trim die. In step 150, the vehicle panel is then scanned with a laser scanner 80 to determine to position of the panel with respect to a predicted position which is the result of a computer simulation process.

The fixture posts are shown as all being linearly insertable and removable from the trim die. Alternatively, the projections from the proximal ends of the second fixture posts 50 may be threaded and the fixture posts 50 screwed into position within the trim die. Flats on the exterior surface of the second fixture post 50 may be provided to facilitate tightening and loosening the second fixture post 50 with a wrench.

The flats 35 on the first fixture posts 26 are shown as being offset by 180 degrees, but other offset configurations, such as 90 degrees are also possible with the apertures 12 on the trim die being machined accordingly.

Although vehicle panel parts are described herein, any stamped part may be scanned using the device and method described herein. Although measurement is described after completion of bending operations, measurement may be performed directly after trimming of the vehicle panel. Measurement is disclosed as taking place while the modified trim die is still within the stamping press. However, the trim die may be removed from the press before measurement is performed.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method of fixturing and determining springback in a deformed part after the part has been trimmed comprising the steps of:

trimming the part in a press using at least one trim die;

raising and supporting the trimmed part on at least three removable fixture posts, at least one fixture post having a top surface shaped to match the underside of the deformed and trimmed part and at least one fixture post having a semi-spherical top surface, whereby one portion of the part is secured in at least one direction securing the at least three fixture posts within apertures in the trim die; and measuring the position of the trimmed part to determine deflection caused by springback.

2. The method of claim 1, wherein the measuring step is performed using a laser type scanner.

3. The method of claim 1, wherein the semi-spherical top surface is magnetic.

4. The method of claim 1, wherein the semi-spherical top surface is steel and a magnet is placed on the opposite side of the part from the semi-spherical top surface to secure the deformed part.

5. The method of claim 1 wherein the deformed and trimmed part is provided with a generally circular hole therein and the deformed and trimmed part is secured in place in X, Y, and Z directions with a screw that passes through the circular hole and into a threaded aperture in the top surface of a fixture post.

6. The method of claim 1 wherein the deformed and trimmed part is provided with a generally rectangular hole therein and the deformed and trimmed part is secured in the X and Z or Y and Z directions with a screw that passes through the rectangular hole and into a threaded aperture in the top surface of a fixture post.

7. The method of claim 1, wherein two of said at least three fixture posts have a top surface shaped to match the underside of the deformed and trimmed part and one fixture post has a semi-spherical top surface.

8. The method of claim 7 wherein the semi-spherical top surface is magnetic and secures the part in the Z direction at one position.

9. The method of claim 1, wherein the part is a vehicle panel.

10. The method of claim 1, wherein two of said at least three fixture posts have a top surface shaped to match the underside of the deformed and trimmed part, and wherein said two fixture posts each include at least two flat side surfaces that engage matching flat surfaces in the apertures in the trim die to prevent rotation of the fixture posts.

11. The method of claim 10, wherein the flat side surfaces in said two fixture posts are offset by 180 degrees.

12. The method of claim 11, wherein each side surface in said two first fixture posts have different widths.

13. A system for trimming a deformed part and measuring the degree of springback in the deformed part comprising:
   a trim die including at least three apertures therein for supporting fixture posts;
   at least 3 removable fixture posts to support the deformed and trimmed part, at least one fixture post having a top surface contoured to match the underside of the deformed part and at least one fixture post having a semi-spherical top surface; and
   a measuring device for measuring the deformed and trimmed part while it is supported on the fixture posts.

14. The system of claim 13, wherein the semi-spherical top surface is magnetic.

15. The system of claim 13, wherein two of said at least three fixture posts have a top surface shaped to match the underside of the deformed and trimmed part, and wherein said two fixture posts each include at least two flat side surfaces that engage matching flat surfaces machined in the apertures in the trim die to prevent rotation of the fixture posts.

16. The system of claim 15, wherein the two flat surfaces of each of the two fixture posts having top surfaces shaped to match the underside of the deformed part are offset by 180 degrees and have different widths.

17. A method of fixturing and determining springback in a trimmed part comprising the steps of:
   trimming the part in a press using at least one trim die having at least a first and second aperture that support buttons used to form apertures in the part;
   raising and supporting the trimmed part on at least three fixture posts, at least two of the posts are secured within the first and second aperture respectively after removal of the buttons and whereby one portion of the part is secured in at least one direction; wherein at least one fixture post has a top surface shaped to match the underside of the deformed and trimmed part; and at least one fixture post has a semi-spherical top surface and
   measuring the position of the trimmed part to determine deflection caused by springback.

* * * * *